NORMAN G. BRANSON
INVENTOR.

BY:

Erwin B. Steinberg

United States Patent Office 3,472,063
Patented Oct. 14, 1969

3,472,063
RESONANT SENSING DEVICE
Norman G. Branson, Stamford, Conn., assignor to Branson Instruments, Incorporated, Stamford, Conn., a corporation of Delaware
Filed Apr. 17, 1967, Ser. No. 631,199
Int. Cl. G01n 29/00; G01m 7/00
U.S. Cl. 73—67.1                    2 Claims

ABSTRACT OF THE DISCLOSURE

A resonant sensing device comprising the sandwich construction of a piezoelectric transducer and a front and a rear mass, when excited to vibrate at resonance, is adapted to measure the surface properties of a test piece. The diamond tipped end of the front mass is brought into force contact with the test piece and by determining the frequency shift of the sensing device from its non-constrained condition to its constrained condition the surface property, i.e. hardness, of the test piece can be ascertained.

---

This invention relates generally to a resonant sensing device which can be used either to determine or test the physical properties or characteristics of a test piece or to determine the magnitude of an applied force, as in a dynamometer, scale or load indicator. More specifically, this invention refers to an alternative embodiment of a resonant sensing device and a control circuit therefor as disclosed in U.S. Patent No. 3,153,338 issued to Claus Kleesattel, entitled "Resonant Sensing Device," dated Oct. 20, 1964.

Sensing devices embodying the invention described in the aforementioned patent are based upon the discovery that the resonant frequencies of a mechanical resonating member held in steady contact with a test piece or abutment are dependent upon the physical properties of the test piece, more specifically, the surface compliance and mechanical impedance thereof, and also to some extent on the force acting to hold the resonating member in steady contact with the test piece or abutment.

The patent identified hereinabove very specifically discloses a slender magnetostrictive rod which is provided with a tip having a contact surface with progressively increasing cross sectional areas, such as a diamond, adapted to be brought into forced engagement with a workpiece whose surface compliance is to be measured. By means of an electromagnetic coil encircling the rod, the rod is vibrated in a longitudinal direction at its resonant frequency, typically 18 to 20 kHz., while the diamond tipped end of the rod is held in steady forced contact with the test piece. When providing a constant engagement force, the shift in resonant frequency of the rod from the condition when the diamond tip end is non-constrained or free to the condition at which the diamond tip end is in forced engagement with the test piece is a measure of the surface compliance of the test piece.

In order to maintain the magnetostrictive rod in its resonant condition, the patent identified hereinabove uses two magnetic coils, one for driving the magnetostrictive rod so as to cause longitudinal vibrations, and the other one serving as a pick-up coil. The pick-up coil provides a feedback signal which is used to drive a variable frequency generator coupled to the driving coil thereby maintaining the rod at its resonant frequency. An alternative control circuit for a magnetostrictive sensing device of this type is shown in my copending application for U.S. Letters Patent Ser. No. 423,214, Norman G. Branson, entitled "Control Circuit for Resonant Sensing Device," filed Jan. 4, 1965, now U.S. Patent No. 3,323,352 issued June 6, 1967. In this latter case, the magnetostrictive rod is driven also by an electromagnetic coil, but a piezoelectric sensing device is used to provide a feedback signal to an amplifier which, in turn, drives the electromagnetic coil.

The present invention concerns an alternative design in which the resonant sensing device includes a piezoelectric driving means. A control circuit is arranged for operating the sensing device at its resonant frequency by monitoring the phase angle existing between the driving voltage and the current and by feedback means maintains the phase angle substantially at zero. This represents resonant condition.

One of the important objects of this invention is, therefore, the provision of a new and improved resonant sensing device.

Another important object of this invention is the provision of an improved and simplified resonant sensing device using a piezoelectric driving means and omitting separate sensing means for developing a feedback signal.

Another important object of this invention is the provision of a resonant sensing device which is characterized by extreme simplicity and ease of operation.

A further and other object of this invention is the provision of a resonant sensing device which is provided with a new and novel driving circuit, omitting separate sensing means coupled to the resonating sensing device itself.

Further and still other objects of this invention will be more clearly apparent by reference to the folowing description when taken in conjunction with the accompanying drawings, in which.

Figure 1:
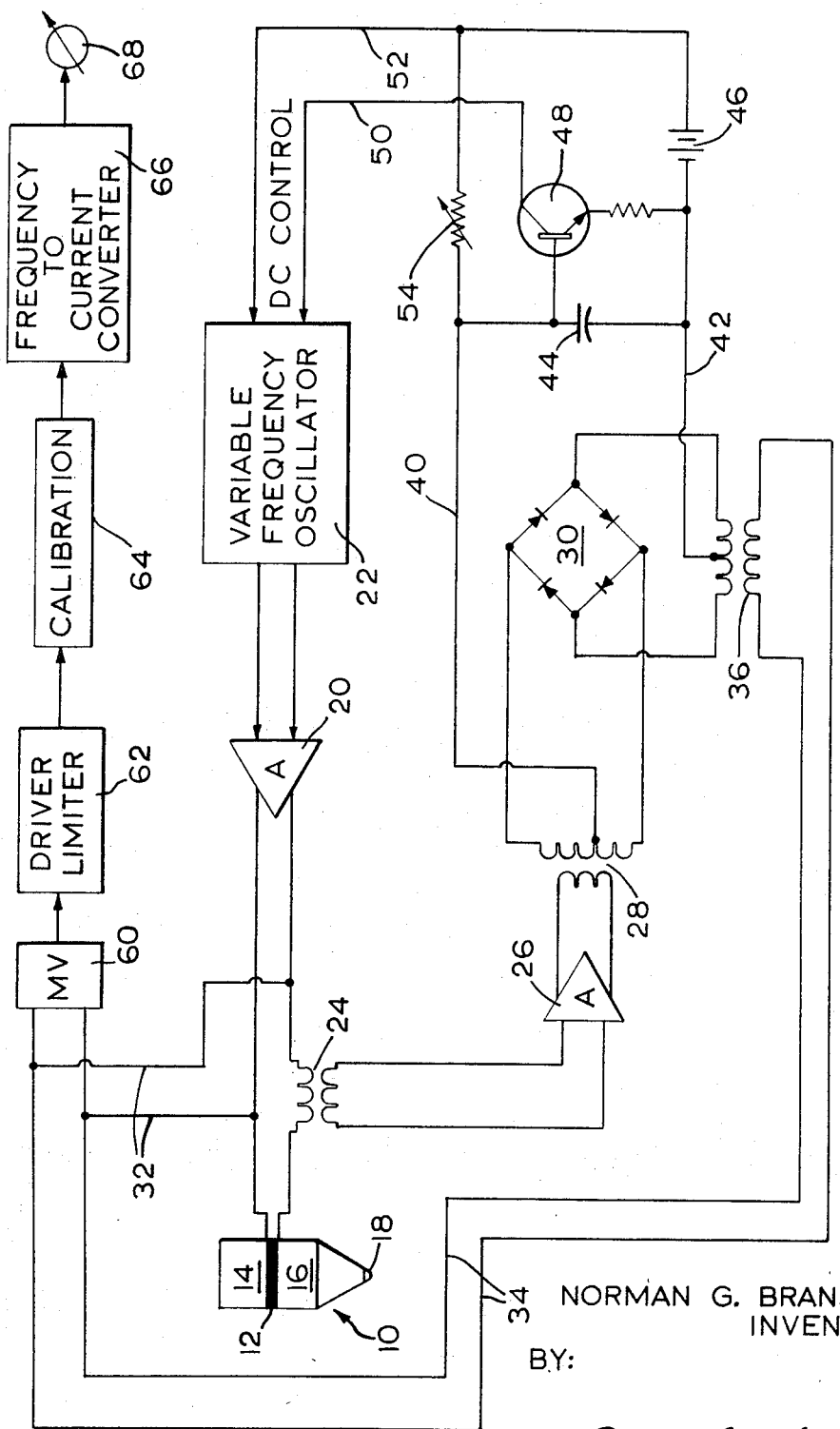
FIGURE 1 is a schematic electrical circuit diagram of the general arrangement of the invention.

Referring now to the figures and FIGURE 1 in particular, numeral 10 identifiies generally a probe adapted to resonate in the sonic or ultrasonic frequency range when driven by an associated electrical circuit. The probe includes the sandwich type construction of a piezoelectric wafer 12 which is held between a rear mass 14 and a front mass 16. The three pieces, that is, the mass 14, the piezoelectric wafer 12 and the mass 16, are cemented together to form a unitary assembly. The mass 16 has a frontal surface which is pointed and fitted with a Vickers diamond 18 for engaging a workpiece which is to be tested. The probe, therefore, has a contact surface with progressively increasing cross sectional areas. The resonant sensing device, as shown, exhibits in its free and unconstrained condition a natural resonant frequency. As the diamond 18 is brought into steady and progressively increasing area contact with a test piece whose surface compliance is to be tested, the acoustic coupling between the test piece and the resonant sensing device causes a change in the resonant frequency of the sensing device, and the softer the test piece, the greater the shift of the resonant frequency to a higher value. This change of resonant frequency is used to indicate the surface compliance or hardness of a test piece as is desccribed in greater detail in the patent to C. Kleesattel supra.

The piezoelectric disk 12 is driven by being connected to the output side of an amplifier 20 whose input terminals are connected to a variable frequency oscillator 22. The oscillator 22, typically, is of the type made by the Vari-L Company, Incorporated, 207 Greenwich Ave., Stamford, Conn. 06904, wherein the freqency supplied by the output side of the oscillator is dependent upon the value of a direct current input or control signal supplied to the input side of the oscillator.

A current transformer 24 whose primary winding is interposed in the connection between the amplifier 20 and the piezoelectric wafer 12 provides via an amplifier 26 and a transformer 28 a signal to a discriminator circuit 30. A signal responsive to the voltage of the output signal from the amplifier 20 to the piezoelectric material 12 is provided by the conductors 32, conductors 34 and the transformer 36 to the discriminator circuit 30. The discriminator circuit 30 provides across the conductors 40 and 42 a D.C. electrical output signal whose magnitude and polarity is a function of the phase angle between the voltage and current applied to the piezoelectric wafer 12. This output signal is applied to a filter capacitor 44, an amplifier stage comprising essentially a source of energy 46 and a transistor 48, and via conductors 50 and 52 as a direct current control signal to the variable frequency oscillator 22. A variable resistor 54 serves to control the amplitude of the control signal. Hence, the variable frequency oscillator 22 is readily controlled in such a manner as to maintain the phase shift between the current and voltage applied to the piezoelectric material 12 substantially at zero, thus denoting resonant condition for the sensing device 10. At the resonant condition, the sensing device 10 will operate essentially as a half wavelength resonator.

The frequency of the resonant sensing device 10 and its change from the non-constrained condition to the constrained condition is discerned by a read-out circuit connected to the output side of the amplifier 20. The read-out circuit includes essentially the series connection of a multivibrator 60, a driver and limiter circuit 62, a calibration control 64, a frequency-to-current converter circuit 66, and a current responsive meter 68 energized from the frequency-to-current converter circuit 66.

Figure 2:
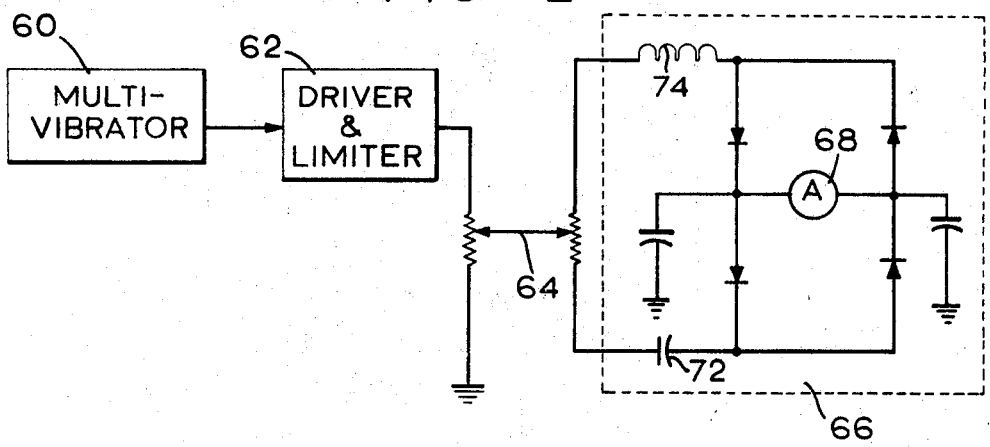
FIGURE 2 is a schematic electrical circuit diagram of portions of the read-out circuit.

The read-out circuit is shown more clearly in FIGURE 2. The multivibrator 60 of conventional construction feeds a driver and limiter circuit 62 which is also of conventional design. Two variable resistors serve as calibration control 64 and are coupled to the frequency-to-current converter circuit 66 which includes a discriminator circuit.

The discriminator circuit has a capacitive reactance branch, capacitor 72, and an inductive reactance branch, inductance 74. The calibration control 64 is adjusted initially so that the circuit impedance of these branches is in balance when the sensing device 10 is in its non-constrained condition. As the resonant sensing device 10 is brought with its diamond tip 18 into engagement with a test piece, the resonant frequency of the sensing device shifts upward, causing a lower circuit impedance in the capacitive branch than in the inductive branch. This unbalance, in turn, causes the meter 68 to indicate a deflection. The scale of the meter is calibrated most suitably in units of hardness, such as "Rockwell." This read-out circuit is described also in detail in the patent to Norman G. Branson supra.

Figure 3:
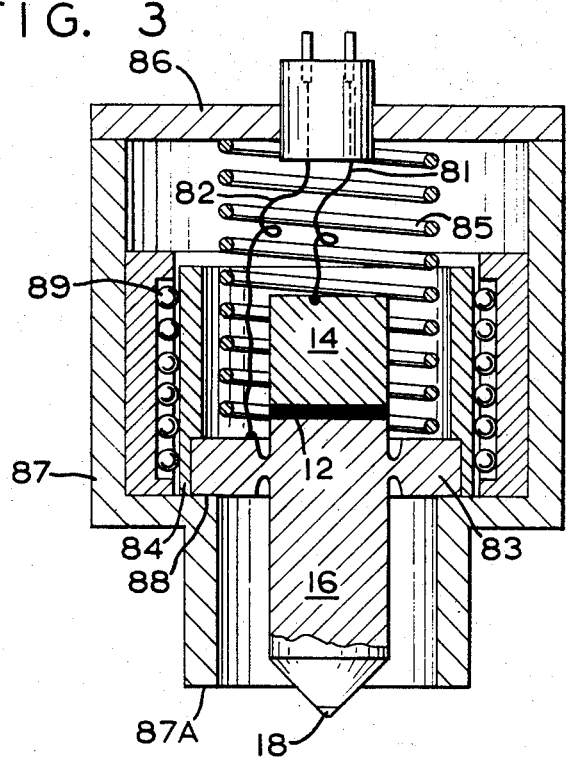
FIGURE 3 shows an embodiment of the resonant sensing device.

FIGURE 3 shows the construction of the resonant sensing device. Numeral 12 identifies the piezoelectric wafer which is sandwiched between the rear mass 14 and the front mass 16. These parts, as stated heretofore, may be bonded together by epoxy resin to form a unitary body. The front mass and rear mass are dimensioned to cause the assembly to be a half wavelength resonator at the operating frequency. Two conductors 81 and 82 establish electrical connection with the opposite plane sides of the wafer 12. The front mass 16 is provided with an annular flange 83 upon which is pressed a cylindrical bushing 84. A helical coil spring 85, seated between the top surface of the flange 83 and the underside of the housing cover 86, urges the sensing device into downward motion, such motion being limited by the shoulder 88 of the housing 87. A linear motion ball bushing 89 is interposed between the bushing 84 and the housing 87 so as to permit translating vertical motion between the sensing device and the housing 87.

In order to perform measurements with this unit, the sensing device is operated by the circuit per FIGURE 2 to be substantially resonant. Then, the diamond tip 18 is set upon the surface of a test piece whose surface compliance is to be measured. The housing 87 slowly is pulled toward the test piece which action compresses the spring 85 and causes the tip 18 to be forced against and into the surface of the material to be tested. Motion of the housing toward the test piece is terminated when the lower underside 87A of the housing engages the surface of the test piece. This standardizes the applied engagement force between the tip 18 and the test piece.

At this point the resonant frequency of the probe has shifted upward and the change in frequency ($\Delta f$) serves as a measure of the surface compliance or hardness of the workpiece at the area engaged by the diamond tip 18.

It will be apparent that the above arrangement is characterized by great simplicity and ease of operation. Separate driving and sensing means for the resonant sensing device are eliminated and a simple circuit is used for maintaining the resonant sensing device at its condition of resonance.

What is claimed is:
1. A resonant sensing device for indicating the surface properties of a workpiece comprising:
   a mechanical resonating means having a front mass, a rear mass and a piezoelectric element interposed therebetween for effecting vibration of said mechanical means at a resonant frequency of the latter;
   said front mass being provided with a contact surface having progressively increasing cross sectional areas for engaging a workpiece whose surface properties are to be tested;
   a housing at least partially enclosing said resonating means;
   means for providing translating motion between said mechanical means and said housing;
   resilient means disposed between said housing and said mechanical means for providing a steady engagement force between said contact surface and a workpiece when setting said housing upon a workpiece and holding it in steady contact therewith, whereby to cause penetration of said contact surface into the surface of the workpiece;
   a variable frequency oscillator coupled for driving said piezoelectric element;
   means coupled for sensing the phase angle between the voltage and the current driving said piezoelectric element;
   means coupled to said means for sensing for developing a control signal responsive to said phase angle;
   means coupled to receive said control signal and for controlling the frequency of said oscillator in response to said control signal for causing said mechanical means to be maintained at its resonant frequency; and
   electrical circuit means coupled to said element for indicating the shift of the resonant frequency of said mechanical means resulting from the steady contact with the workpiece.
2. A resonant sensing device as set forth in claim 1, said piezoelectric element being a flat wafer, its faces bonded with epoxy resin respectively to said front mass and rear mass whereby to produce a unitary assembly.

References Cited

UNITED STATES PATENTS

| | | | |
|---|---|---|---|
| 2,728,868 | 12/1955 | Peterson | 310—8.4 |
| 3,045,491 | 7/1962 | Hart | 73—398 |
| 3,153,338 | 10/1964 | Kleesattel | 73—67.1 |
| 3,308,476 | 3/1967 | Kleesattel | 73—67.1 |

RICHARD C. QUEISSER, Primary Examiner

JOHN R. FLANAGAN, Assistant Examiner